Patented July 27, 1926.

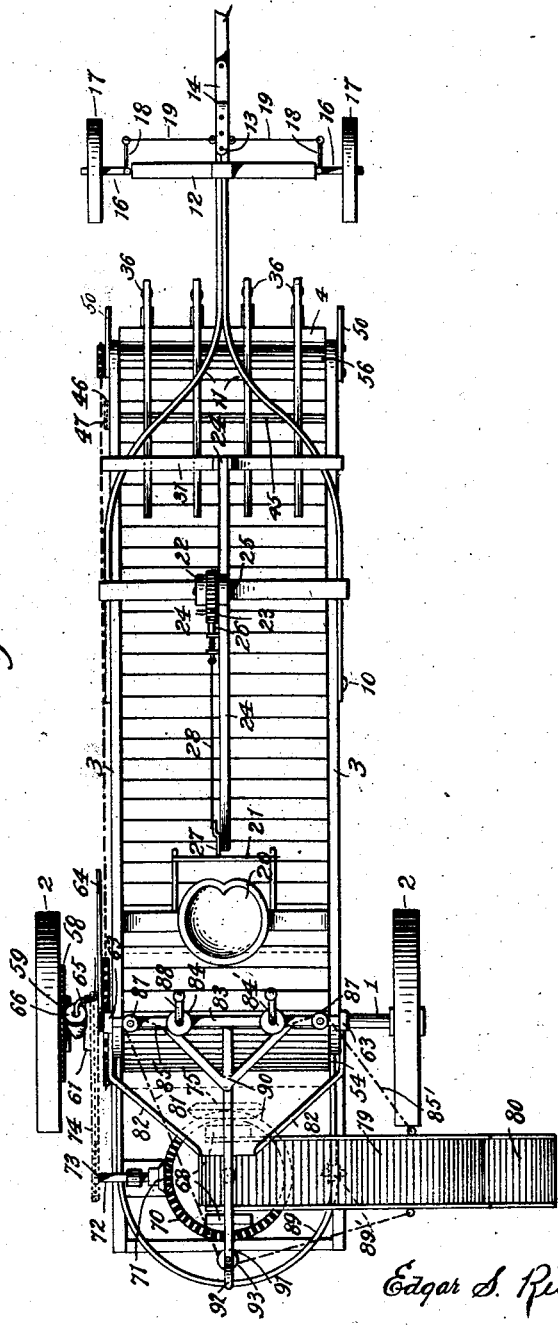

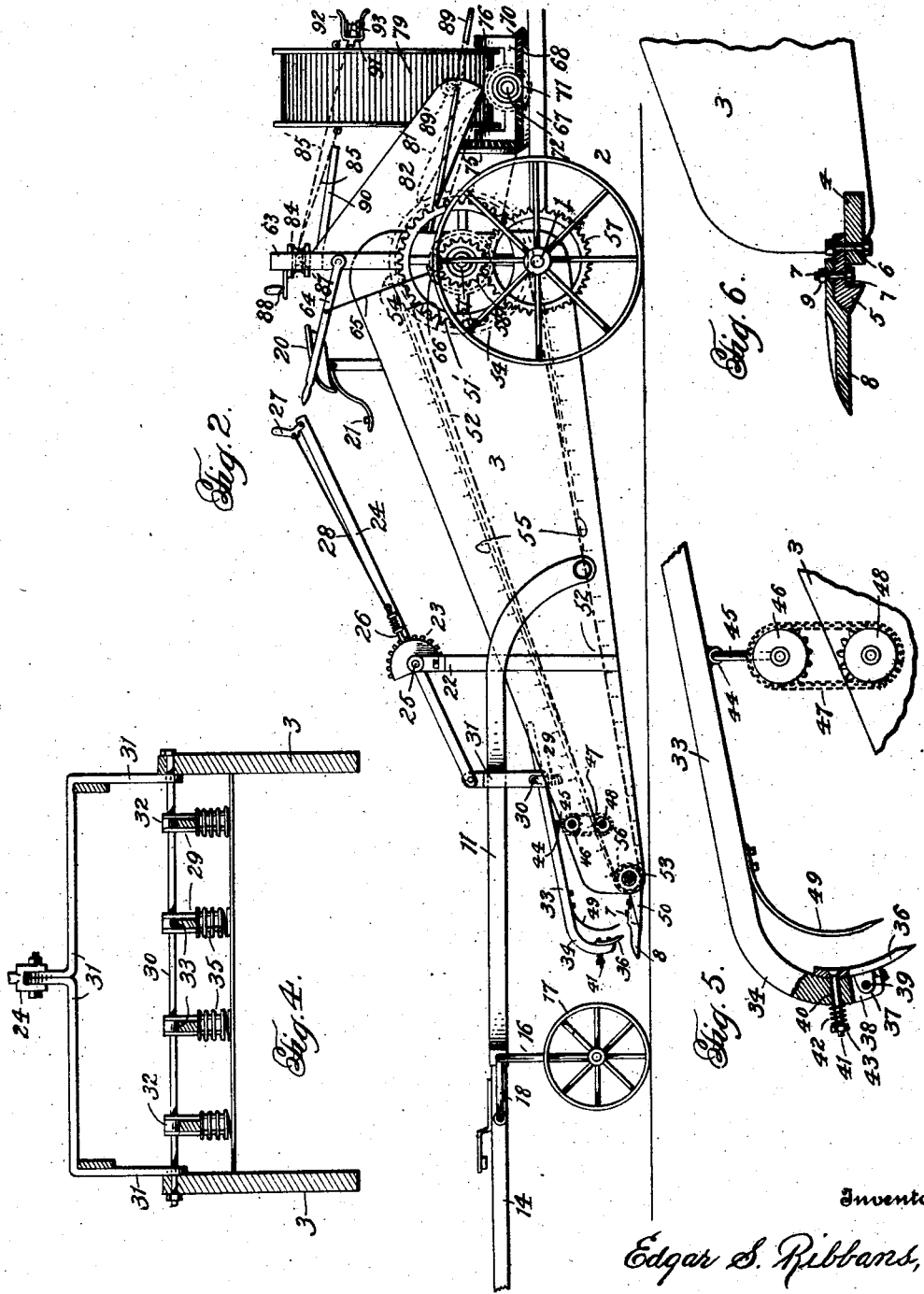

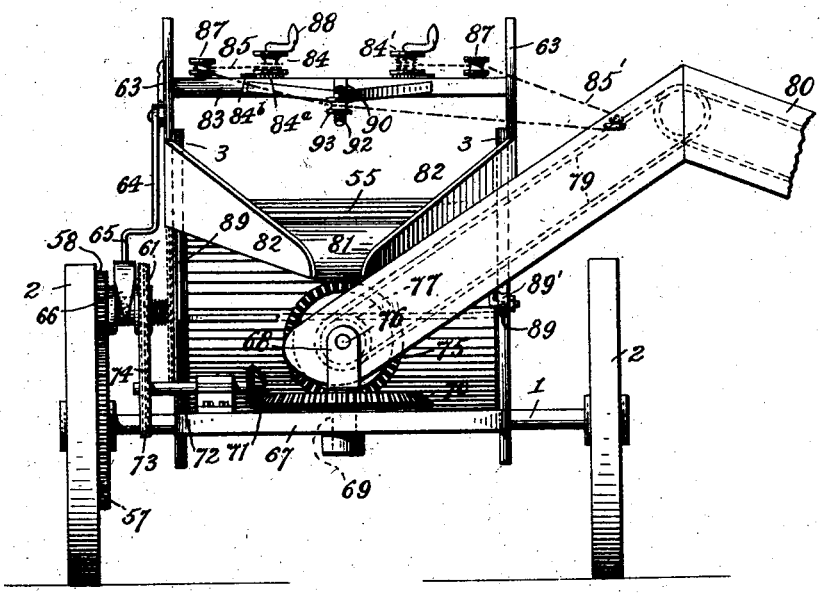

1,593,952

UNITED STATES PATENT OFFICE.

EDGAR S. RIBBANS, OF JUTLAND, NEW JERSEY.

STONE GATHERER.

Application filed December 23, 1921. Serial No. 524,486.

My invention relates to new and useful improvements in a stone gatherer and has for its principal object a device of this character which may be drawn over a roadway or field, picking up the stones, elevating them, and delivering into a receptacle, the receptacle preferably being in the form of a wagon driven alongside of the gatherer.

Another object resides in the provision of a novel form of elevator which may be swung to either side of the gatherer so as to deliver the stones into a receptacle on either side of the gatherer.

Still another object consists in providing a plurality of gathering fingers for depositing the stones upon the elevator, said fingers being yieldable so as to give, in case of engagement with an unyielding object, to prevent breakage thereof.

Still another object resides in the provision of novel means for adjusting and operating the several parts, the movement of the machine over the ground serving as the power for transmitting motion to the gathering fingers and the elevators.

With the above and other objects in view, which will appear as the description proceeds, my invention consists in the novel details of construction described and illustrated in the following specification and claims, and while I have illustrated and described the preferred embodiments of the invention it will be understood that such changes may be made as will fall within the scope of the appended claims.

In the drawings:—

Fig. 1 is a top plan.

Fig. 2 is a side elevation.

Fig. 3 is a rear elevation.

Fig. 4 is a transverse vertical section showing the guides for the gathering fingers with parts shown in elevation.

Fig. 5 is a fragmental side elevation, with parts shown in section, of one of the gathering fingers.

Fig. 6 is a transverse vertical section through one of the gathering teeth and supporting bar therefor, with a portion of one of the side rails shown in elevation, and Fig. 7 is a sectional detail of the driving gears and operating fork therefor.

In the drawings 1 indicates a rear axle upon which are rotatably mounted the ground wheels 2, and 3 indicates the side rails of a forwardly and downwardly extending frame, the rear ends of which are pivotally connected to the axle 1 so that the forward ends may be raised and lowered in a manner to be later described. Secured to and between the forward ends of the side rails 3 is a horizontal bar or platform 4 to which is secured a bar 5 by means of the bolts 6 or other suitable fastening means. As will be noted the rear edge of this bar 5 is slightly spaced from the forward edge of the platform 4 so as to provide a recess for the reception of the heads of bolts 7 which are used for securing the forwardly extending teeth 8 to the bar 5. Nuts 9 will be received on the bolts 7 to engage the upper faces of the teeth 8, which are of a construction similar to those used in harvesters and the like.

Pivotally connected to the side rails 3, at 10, is a forked beam 11 to the forward end of which is connected the cross bar 12 having pivotally connected thereto at 13 the draft tongue 14 to which the usual form of whiffletree, not shown, may be connected. Rotatably connected to each end of the cross bar 12 is an angle iron axle 16 carrying the ground wheels 17. An arm 18 is formed on or secured to each of the vertical portions of the axle and a link 19 connects these arms with the draft tongue 14 so that the axles, and their associated wheels, will be turned as the draft tongue is swung from one side to the other. It will be understood that draft animals will preferably be used for drawing the apparatus over the ground.

Supported upon the forwardly extending frame is a seat 20 having a foot rest 21 and connected to the beam 11 in any suitable manner, such as by bolts or rivets, adjacent the rear pivoted end, is a standard 22 having a toothed segment 23 secured thereto. A lever 24 is pivotally connected to the standard at 25 and has a pawl 26 adapted to engage the toothed segment 23, the pawl 26 being operated by the handle 27 connected to the pawl by means of the rod 28 which extends parallel with the lever 24. Secured between the side rails 3, of the forwardly extending frame, adjacent the forward ends thereof, are the vertically extending bars 29, the upper ends of which are connected by a cross rod 30. The bars 29 are supported on a transversely extending member which is secured between the sides 3. A frame 31 straddles the beam 11, the upper end being connected to the forward end of the lever 24, and the lower ends are connected to the cross rod 30. By this construction when the lever 24 is operated the forward end of the forwardly extending frame may be raised or lowered so as to elevate the teeth 8 a greater or less extent from the ground over which the machine is being drawn. A roller 32 is mounted on the cross rod 30, intermediate the side bars 29, and forms a bearing for the upper surface of the gathering fingers which consists of the horizontally extending portions 33 and the curved ends 34. A coil spring 35 surrounds each pair of the side bars 29 and engages the under surface of the portions 33 of the gathering fingers so as to normally hold the same in engagement with the roller 32. Secured to the rear face of the curved portions 34, of the gathering fingers, are the shoes or blades 36, each of these shoes or blades having an eye 37, formed on its rear face, which extends into an opening 38 formed in the fingers, a pin being inserted through the transversely extending opening 39 and the eye 37 for pivotally connecting the said shoe or blade to the gathering fingers. An opening 40 is formed adjacent the upper edge of each of these shoes or blades 36 and a bolt 41 passes through the opening and through the curved portion of the fingers, and as shown, a coil spring 42 surrounds the bolt 41 between the outer face of the fingers and the adjustable nut 43 received upon the bolt. By this construction should an obstruction be encountered the shoe or blade may swing upon its pivot to pass over the obstruction and to prevent breakage. Each of the gathering fingers is provided with a bearing 44 through which a crank rod 45 passes for reciprocating and raising and lowering the fingers, the ends of the rods being supported in the sides 3, said crank arm having a sprocket wheel 46 secured to one end thereof and around which a chain 47 passes, the opposite end of the chain passing around a sprocket wheel 48 secured to one of the side rails 3 of the forwardly extending frame and operated in a manner to be later described. A plurality of spring fingers 49 are secured to the horizontal portion 33 of the gathering fingers and extend downwardly at an angle in front of the shoes or blades 36 as shown.

Secured adjacent the ends of the bar 5 which carries the teeth 8, are the side irons 50 which prevent the stones being gathered from passing off to the side of the machine.

Secured to a shaft 51, which is rotatably mounted in the side rails 3 is a sprocket wheel 51' around which extends an endless chain 52, the forward end of said chain extending around the sprocket wheel 53. It will be noted that the sprocket wheel 53 is of less diameter than the sprocket wheel 51 and therefore throws the upper flight of the chain downwardly towards the forward end. Secured to the shaft 51, between the side rails 3 is a drum 54 around which operates the conveyor 55, the forward end of the conveyor extending around a small drum 56 mounted between the side rails 3 adjacent the forward ends thereof. As quite clearly shown in the drawings the upper flight of the conveyor 55 extends at an angle so as to elevate the stones received thereon. Secured to and adapted to rotate with one of the ground wheels 2 is a gear 57 which meshes with a gear 58 loosely mounted upon the shaft 51. This gear wheel 58 has teeth 59 formed on its inner face and adapted to interlock with teeth 60 formed on the outer face of a sprocket wheel 61 which is slidably keyed to the shaft 51. A spring 62 normally forces the sprocket wheel 61 towards the sprocket wheel 58 so that the clutch teeth thereof will normally interlock whereby the said sprocket wheels will operate in unison.

Upwardly extending standards 63 are secured to the side rails 3, adjacent their rear ends, and pivotally connected to one of said standards is a lever 64 to which is connected the rod or bar 65, the lower end of which is forked and wedge shaped as shown at 66, said wedge shaped forked end adapted to engage between the clutch faces of the sprocket wheels 58 and 61 so that when the lever 64 is lowered the sprocket 61 will be forced away from the sprocket 58, against the action of the coil spring 62, and disengage the clutch teeth. When this is done the sprocket wheel 58 will operate as an idler and the conveyor 55 will be stopped. It will be noted that the lever 64 is so positioned as to be in easy reach of the operator seated in the seat 20 and that the lever 24 also extends within reach of the operator. Secured to the forwardly extending frame is a rearward extension or platform 67 which has rotatably mounted thereon the U shaped frame 68, said frame having a downwardly extending projection 69 received in a socket formed in said platform. A bevel gear wheel 70 is rotatably mounted upon the projection 69, between the frame 68 and platform 67, said bevel gear wheel 70 having meshing therewith a small bevel gear 71 secured to the end of the transversely extending shaft 72. A sprocket wheel 73 is secured to the opposite end of the shaft 72 and has extending therearound a sprocket chain 74 which also extends around the sprocket wheel 61. Meshing with the bevel gear 70 is also the vertically extending bevel gear 75 which is secured to the inner end of a transversely extending shaft 76 mounted in the U shaped frame 68. Sprocket wheels 77 are secured to the pivot 76, intermediate the ends of the frame 68, and receive the chains (not shown), of an endless conveyor 79, this conveyor extending upwardly at an angle and supported, adjacent the upper end, in a manner to be later described. Extending downwardly at an angle, from the upper end of the conveyor 79, is a chute or platform 80 to which the stones are delivered from the said conveyor 79 for discharge into a wagon or other receptacle. A chute 81 is connected to the standards 63 in such a manner as to receive the stones from the conveyor 55 and discharge them onto the conveyor 79. This chute 81 will preferably be connected to the standards by means of the arms 82.

A horizontal bar 83 is secured to the upper ends of the standards 63 and carries the transversely spaced rotatable drums 84 and 84'. A chain 85 has one end connected to the drum 84 and the opposite end connected to one side of the conveyor 79 whereas a chain 85' has one end connected to the drum 84' and the opposite end connected to the opposite side of the conveyor 79. Rotatably mounted on each end of the bar 83 are pulleys 87 around which the chains 85 and 85' pass, said pulleys acting as guides for the chains. When the conveyor is to be swung from one side to the other one of the chains is wound upon that drum to which it is connected. Each of the drums is provided with a ratchet wheel 84ª adapted to be engaged by a pawl 84ᵇ carried on the bar 83. The pawls and ratchets will prevent accidental rotation of the drums. The drums may be provided with crank handles 88 or if desired an interchangeable handle may be provided. A downwardly inclined semicircular track 89 is secured to the standards 63 and forms a guide for the wheels 89' secured to the underside of the conveyor. This track not only acts as a support for the conveyor but when it is desired to swing the same, being downwardly extended, will give an initial movement to the conveyor to start its swing.

Extending rearwardly from the bar 83 is an arm 90 having the vertically spaced extensions 91, the outer ends of which are flared outwardly as shown at 92. A pulley 93 is rotatably mounted between the extensions 91 and forms a bearing for the chains 85 and 85', at the same time properly positioning the chains so that the conveyor 79 may be swung from side to side.

From the above description it will be seen that I have provided a stone gatherer which may be drawn over the ground to collect the stones, the machine being drawn by draft animals, or, if desired, by a tractor. By swinging the tongue 14 from one side to the other the wheels 17 will be turned to guide the apparatus and the ground wheels 2 serve to transmit power to the various operating parts. The rotation of the ground wheels 2 rotates the gear wheel 57 which, meshing with the gear wheel 58, when the teeth 59 and 60 of the gear 58 and sprocket 61, mesh, will rotate the sprocket 61 and the shaft 51. The rotation of the shaft 51 rotates the drum 54 and in turn the elevator 55. The operation of the elevator 55 through means of the chain 52 also rotates the gear wheel 48 which through the chain 47 operates the crank shaft 45. The chain 52 engages and operates a gear wheel, not shown, on the inner end of the shaft to which is secured the gear 48. The rotation of the crank shaft reciprocates the gathering fingers which, through means of the shoes or blades 36 gather the stones upon the cross bar 4 and from there on to the conveyor 55. It will be noted that the gathering fingers are also raised and lowered by the crank shaft and the horizontal portions 33 thereof are guided by the bars 29 and by means of the springs 35 are held in engagement with the rollers 32. Should a flat obstacle be encountered by the point of the shoe or blade 36 the spring 35 will be pressed to allow the gathering fingers to yield without breaking. Should the shoe or blade 36 engage the edge of a solid obstacle the spring 42 surrounding the bolt 41 will be compressed so that the said shoe or blade 36 will swing upon its pivot to pass over the said obstacle. The stones are raised by the conveyor 55 and dropped from the upper end thereof into the chute 81 from which they are deposited upon the endless conveyor 79. This conveyor 79 is directed towards the side of the gatherer and the stones raised thereby are discharged onto the platform 80 from which they are delivered into a wagon or other receptacle drawn along beside the gatherer. The gear wheel 57 is rotated by the ground wheel 2 and meshing with the gear wheel 58 rotates the sprocket wheel 61. The sprocket wheel 73 is driven through means of the chain 74 and rotates the horizontal shaft 72 and bevel gear 71. The bevel gear 71 rotates the bevel gear 70 which meshing with the bevel gear 75 operates the side conveyor 79. The endless conveyor 79 is supported by a frame which is mounted upon the shaft 76 carried by the U-shaped frame 68. The U-shaped frame 68 may be rotated upon its projection 69, entering the socket, to draw the conveyor to either side of the gatherer. The swinging of this conveyor is accomplished through means of the drums 84 and 84' and associated chains 85 and 85' connected to the conveyor. It will be noted that as one of the chains is wound upon its associated drum the other will be unwound from its associated drum. The downwardly extending semi-circular track 89 supports the conveyor when it is swung from side to side and at the same time will give the conveyor its initial movement to swing when the chains are loosened. The teeth 8 may be raised or lowered towards or away from the surface of the ground by means of the lever 24 and when it is desired to stop the operation of the conveyors the lever 64 is lowered so that the wedge shaped forked end 66 will be forced between the sides of the gear 58 and sprocket 61, thereby forcing the clutch face of the sprocket 61 away from the clutch face of the gear 58 and placing the spring 62 under compression. When the wedge shaped forked end 66 is raised the spring 62 will return the parts to their original position with the clutch faces interlocking. When the wedge shaped forked member is lowered to separate the clutch faces it will be seen that the gear 58 operates upon the shaft 51 as an idler.

It will be noted that I have provided a machine for the purpose described which is in the form of a unitary device, the elevating conveyors and the gathering fingers being operated through the ground wheels of the vehicle itself. It is only necessary to attach the draft animals or a tractor to the tongue 14, no other power whatsoever being necessary, such as expensive engines or similar motive power.

Having fully described my invention what I claim as new and desire to secure by Letters Patent is:

1. A stone gatherer comprising a frame, a conveyor, fingers for gathering the stones upon the conveyor, and yieldable guides for said fingers.

2. A stone gatherer comprising a supporting frame, a conveyor carried by the supporting frame, fingers for gathering the stones on to the conveyor, guides for said fingers, rollers carried by said guides for engaging the upper surfaces of the fingers, and springs carried by said guides for engaging the lower surfaces of said fingers to normally hold the fingers in engagement with the rollers.

3. A stone gatherer comprising a supporting frame, a conveyor, fingers for gathering the stones upon the conveyor, said fingers including substantially horizontally extending portions, guides for receiving the substantially horizontally extending portions of the fingers, and means for imparting reciprocating and vertical movement to the fingers.

4. A stone gatherer comprising a supporting frame, a conveyor, yieldable guides, gathering fingers having a portion operable in the guides, and means for imparting a sliding and swinging movement to the fingers.

5. A stone gatherer comprising a supporting frame, a conveyor, yieldable guides, gathering fingers having a portion operable in the guides, yieldable blades carried by the gathering fingers, and means for imparting a sliding and swinging movement to the fingers.

In testimony whereof I hereunto affix my signature.

EDGAR S. RIBBANS.